United States Patent
Keppel et al.

(10) Patent No.: US 9,329,658 B2
(45) Date of Patent: May 3, 2016

(54) BLOCK-LEVEL SLEEP LOGIC

(71) Applicant: Intel Corporation, Santa Clara, CA (US)

(72) Inventors: David Pardo Keppel, Seattle, WA (US); Jawad Nasrullah, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 466 days.

(21) Appl. No.: 13/729,376

(22) Filed: Dec. 28, 2012

(65) Prior Publication Data

US 2014/0189401 A1 Jul. 3, 2014

(51) Int. Cl.
*G06F 1/32* (2006.01)
(52) U.S. Cl.
CPC .................... *G06F 1/3206* (2013.01)
(58) Field of Classification Search
None
See application file for complete search history.

(56) References Cited

U.S. PATENT DOCUMENTS

| | | | |
|---|---|---|---|
| 2007/0198863 A1* | 8/2007 | Bose et al. | 713/300 |
| 2009/0022068 A1* | 1/2009 | Iyer et al. | 370/254 |
| 2009/0199020 A1* | 8/2009 | Bose et al. | 713/300 |
| 2010/0031071 A1* | 2/2010 | Lu | G06F 1/3203 713/323 |

* cited by examiner

*Primary Examiner* — Paul Yanchus, III
(74) *Attorney, Agent, or Firm* — Trop, Pruner & Hu, P.C.

(57) ABSTRACT

In one embodiment, a processor includes at least one sleep block and a central sleep controller. The at least one sleep block may include at least one execution unit, at least one processor component, and sleep logic. The central sleep controller may be to program the sleep logic to perform at least one sleep transition for the at least one sleep block, and to operate in a first sleep mode. The sleep logic may be to perform the at least one sleep transition for the at least one sleep block without waking the central sleep controller from the first sleep mode. Other embodiments are described and claimed.

23 Claims, 9 Drawing Sheets

BLOCK-LEVEL SLEEP LOGIC

BACKGROUND

Embodiments relate generally to power management.

Conventionally, an electronic device may include a "sleep" mode, meaning an operating mode in which the components of the device are placed in a reduced power state. The use of a sleep mode may reduce the amount of electrical power consumed in comparison to an "awake" or normal operating mode. Sleep modes may also be referred to as stand-by modes, hibernation modes, suspend modes, etc.

DETAILED DESCRIPTION

In accordance with some embodiments, block-level sleep logic may be provided. In one or more embodiments, a system or device may be divided into sleep blocks, meaning a group of components specified as sharing a common sleep mode. In some embodiments, a central sleep controller may program a sleep logic included in each sleep block. Once programmed, each sleep logic may transition between sleep modes independently. Thus, in some embodiments, the sleep modes of the sleep blocks may be managed without waking the central sleep controller.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below.

Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US economy.

Figure 1A:
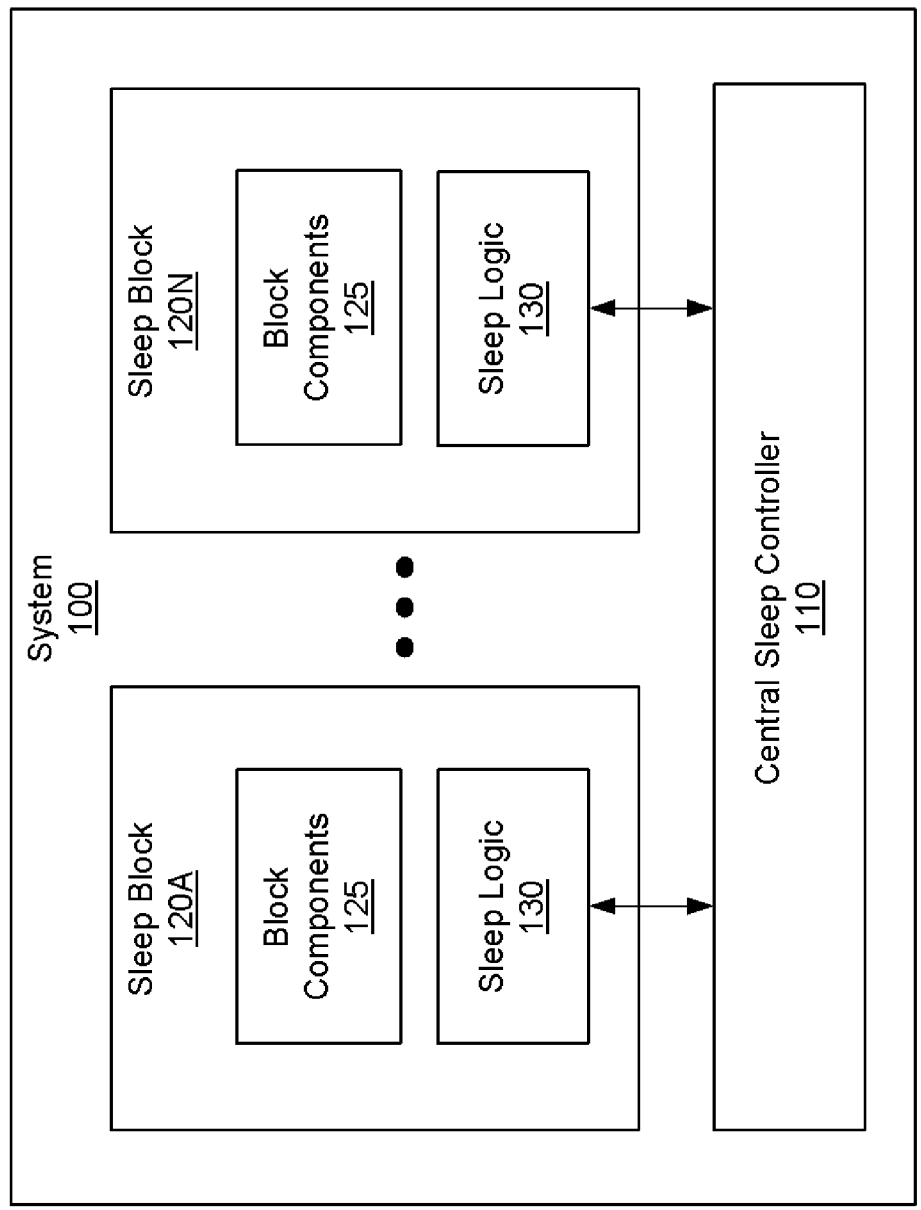
FIGS. 1A-1B are block diagrams of systems in accordance with one or more embodiments.

Referring to FIG. 1A, shown is a block diagram of a system 100 in accordance with one or more embodiments. In some embodiments, the system 100 may be all or a portion of an electronic device or component. For example, the system 100 may be a cellular telephone, a computer, a server, a network device, a processor, a system on a chip (SoC), a controller, a wireless transceiver, a power supply unit, etc. Furthermore, in some embodiments, the system 100 may be any grouping of related or interconnected devices, such as a datacenter, a computing cluster, a peer-to-peer (P2P) network, a local area network (LAN), a wide area network (WAN), a wireless ad hoc network, etc.

As shown in FIG. 1A, the system 100 may include any number of sleep blocks 120A-120N. In one or more embodiments, each sleep block 120 may include one or more block components 125 whose sleep states are managed together. Stated differently, the block components 125 are to implement a common sleep mode at the same time. In some embodiments, each sleep block 120 may correspond to a functional unit or module (e.g., a set of components configured to perform one or more functions). For example, in some embodiments, the sleep blocks 120 may represent hardware modules included in a computer, processing cores included in a processor, radio interface modules included in a wireless communication device, servers included in a datacenter, nodes included in a network, drives included in a storage array, etc.

As shown, in one or more embodiments, each sleep block 120 may include a sleep logic 130. In some embodiments, the sleep logic 130 may include functionality to control or manage one or more sleep modes of the sleep block 120. In some embodiments, each sleep mode may correspond to a particular combination of reduced levels of functionality and/or power consumption in comparison to an "awake" or normal operating mode. For example, in some embodiments, the sleep logic 130 may provide a "shallow" sleep mode, meaning a sleep mode which has a relatively low level of power savings, but which maintains a relatively high level of functionality, or which may require a relatively short time to restore full functionality. Further, the sleep logic 130 may provide a "deep" sleep mode, meaning a sleep mode which has a relatively high level of power savings, but which maintains a relatively low level of functionality, or which may require a relatively long time to restore full functionality. In some embodiments, the sleep logic 130 may also provide additional sleep modes having levels of functionality and/or power savings between those of the shallow sleep mode and the deep sleep mode (e.g., a "medium" sleep mode, a "medium-shallow" sleep mode, a "medium-deep" sleep mode, etc.).

In some embodiments, the sleep logic 130 may include any type of device and/or circuit for controlling the sleep modes of a particular sleep block 120. For example, assume that a first sleep block 120A uses a single sleep mode triggered by a period of inactivity. Assume further that a second sleep block 120N uses any of several sleep modes, depending on whether various conditions are satisfied. In this example, the sleep logic 130 of the first sleep block 120A may be a simple timing circuit to switch off electrical power after the period of inactivity. Further, in this example, the sleep logic 130 of the second sleep block 120B may include a processor and memory, and may execute a software program to evaluate whether the various conditions are satisfied. Note that these examples of the sleep logic 130 are not intended to limit any embodiments.

As shown, in one or more embodiments, the system 100 may include a central sleep controller 110 to control the sleep logic 130 included in each of the sleep blocks 120. In particular, in some embodiments, the central sleep controller 110 may program the sleep logic 130 to perform sleep transitions. As used herein, the term "sleep transition" may refer to one or more actions required to transition a sleep block 120 into or out of a particular sleep mode. For example, such actions may include saving data stored in buffers, cleaning dirty entries of a cache, reducing power levels, disabling data interfaces, etc.

In some embodiments, the sleep logic 130 may perform sleep transitions into a sleep mode, out of a sleep mode, and/or between sleep modes. An example of such sleep transitions is discussed below with reference to FIG. 2A.

Figure 2A:
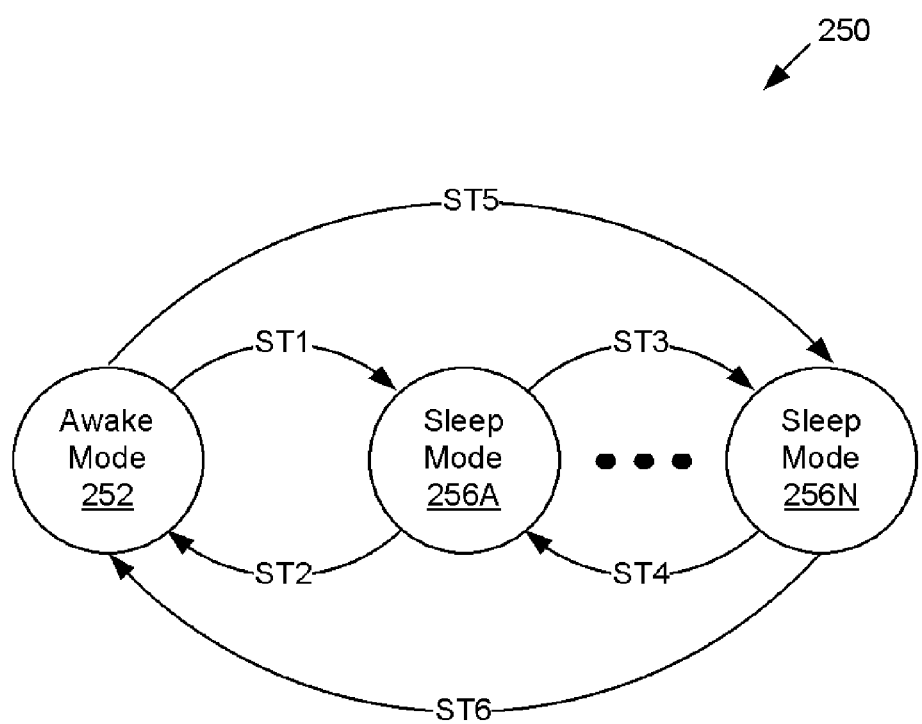
FIG. 2A-2B are example diagrams in accordance with one or more embodiments.

Referring now to FIG. 2A, shown is an example diagram 250 in accordance with one or more embodiments. In particular, the diagram 250 may illustrate operating modes or states of a sleep block 120 shown in FIG. 1A.

In some embodiments, the sleep block 120 may operate in an awake mode 252 (e.g., a non-reduced power mode). Further, the sleep block 120 may operate in any number of sleep modes 256A-256N, which may correspond to different sleep levels or depths. For example, sleep mode 256A may be a shallow sleep mode, sleep mode 256N may be a deep sleep mode, etc.

In one or more embodiments, the sleep logic 130 (shown in FIG. 1A) may perform sleep transitions to transition the sleep block 120 into any of sleep modes 256A-256N. For example, as shown in FIG. 2A, the sleep logic 130 may perform a sleep transition ST1 to transition the sleep block 120 from the awake mode 252 to the shallow sleep mode 256A. Further, the sleep logic 130 may perform a sleep transition ST5 to transition the sleep block 120 from the awake mode 252 to the deep sleep mode 256N.

In one or more embodiments, the sleep logic 130 may perform sleep transitions to transition the sleep block 120 out of any of sleep modes 256A-256N. For example, as shown in FIG. 2A, the sleep logic 130 may perform a sleep transition ST2 to transition the sleep block 120 from the shallow sleep mode 256A to the awake mode 252. Further, the sleep logic 130 may perform a sleep transition ST6 to transition the sleep block 120 from the deep sleep mode 256N to the awake mode 252.

In one or more embodiments, the sleep logic 130 may perform sleep transitions to directly transition the sleep block 120 between any of sleep modes 256A-256N. For example, as shown in FIG. 2A, the sleep logic 130 may perform a sleep transition ST3 to transition the sleep block 120 from the shallow sleep mode 256A to the deep sleep mode 256N. Further, the sleep logic 130 may perform a sleep transition ST4 to transition the sleep block 120 from the deep sleep mode 256N to the shallow sleep mode 256A. Note that the sleep transitions ST3, ST4 occur without entering the awake mode 252.

Referring again to FIG. 1A, in some embodiments, the central sleep controller 110 may program the sleep logic 130 using any technique and/or device, including program instructions, firmware, control/status registers, flag bits, logic gate/switch settings, etc. For example, the central sleep controller 110 may transmit program instructions to the sleep logic 130. In another example, the central sleep controller 110 may configure logic gates and/or control registers included in the sleep logic 130. Further, in some embodiments, programming the sleep logic 130 may involve any number and type of parameters, including system events, voltage levels, date/time values, temperature, network usage, processing loads, power costs, user commands, bus signals, etc. Such program information and/or parameters may be referred to generally as a "transition program." In some embodiments, a transition program may include conditions and/or events that indicate a requirement to perform a sleep transition. Further, in some embodiments, a transition program may include one or more actions required to perform the sleep transition.

In some embodiments, the central sleep controller 110 may include functionality to initiate a sleep mode for all or part of the system 100 (referred to as a "system-wide sleep mode"). Further, the central sleep controller 110 may also include functionality to initiate sleep modes for any portions of the system 100. For example, the central sleep controller 110 may cause all of the system 100 to enter a shallow sleep mode. In another example, the central sleep controller 110 may cause a first sleep block 120 to enter a shallow sleep mode, a second sleep block 120 to enter a deep sleep mode, etc. In yet another example, the central sleep controller 110 may put itself into a deep sleep mode.

In one or more embodiments, the central sleep controller 110 may program the sleep logic 130 in preparation for initiating a sleep mode in one or more sleep blocks 120, or for the system 100 as a whole. For example, in response to a requirement for a system-wide sleep mode, the central sleep controller 110 may program the sleep logic 130 prior to initiating the system-wide sleep mode. Further, in some embodiments, the central sleep controller 110 may program the sleep logic 130 at any other time. For example, such programming may occur at a system boot-time, according to a periodic schedule, in response to a user command, in response to a system event or state, etc.

In one or more embodiments, the sleep logic 130 may include functionality to store one or more to transition programs (i.e., any information and/or parameters provided by the central sleep controller 110 to perform sleep transitions). For example, the sleep logic 130 may store program information and/or parameter values in volatile memory, non-volatile memory, a storage medium, control registers, etc.

In one or more embodiments, the sleep logic 130 may include functionality to perform sleep transitions based on the stored transition programs. Specifically, in some embodiments, the sleep logic 130 may monitor any parameters or inputs specified in conditions of the transition programs, and may thus determine if a sleep transition is required. For example, the sleep logic 130 may monitor system events, voltage levels, bus signals, user inputs, network events, clocks/timers, etc.

In one or more embodiments, a transition program may specify that a sleep transition is initiated in response to a specified period of inactivity (e.g., no network and/or bus activity for the last ten microseconds, no user interaction during the last fifty microseconds, etc.). Further, in some embodiments, the transition program may specify that the sleep transition is performed in order to satisfy required levels of availability and/or responsiveness. For example, a sleep transition from a deep sleep mode to a shallow sleep mode may be performed in order to satisfy a required time of response to a user command.

In some embodiments, the transition program may specify that the sleep transition is performed based on combinations of multiple parameters or events. For example, assume that the system 100 is to enter an awake mode each time a periodic "heartbeat" timer expires. Assume further that the sleep logic 130 receives a signal indicating a requirement to initiate a deep sleep mode. In addition, assume that the sleep logic 130 is monitoring the periodic timer, and determines that the periodic timer will expire in a given period of time (e.g., 10 microseconds). In this situation, the sleep logic 130 may determine that, because the periodic timer will expire in less than a specified threshold (e.g., 20 microseconds), initiating the deep sleep mode will cause the system 100 to consume too much energy when the system 100 later has to awake (i.e., when the periodic timer expires), thereby negating any power savings associated with the deep sleep mode. Further, the sleep logic 130 may determine that initiating the deep sleep mode will cause the system 100 to consume too much time to awake when the periodic timer expires, thereby violating a required level of system performance. Furthermore, the sleep logic 130 may determine that initiating a shallow sleep mode may conserve energy without violating the required level of system performance. Accordingly, in this situation, the sleep logic 130 may initiate a shallow sleep mode instead of the deep sleep mode in response to the received signal.

In some embodiments, by using the stored transition programs, the sleep logic 130 may perform sleep transitions independently (i.e., without interacting with the central sleep controller 110 and/or any other sleep block 120). As such, when the central sleep controller 110 is in a sleep mode, the sleep logic 130 may perform a sleep transition without waking the central sleep controller 110 (i.e., without causing the central sleep controller 110 to exit from a sleep mode). Similarly, if other sleep blocks 120 are in sleep modes, the sleep logic 130 may perform the sleep transition without waking the other sleep blocks 120. Note that, in this manner, each sleep block 120 may transition between sleep modes without affecting the remainder of the system 100, thereby reducing the amount of electrical power and/or time required to perform sleep transitions. An example of reducing power consumption and/or time by using the sleep logic 130 is discussed below with reference to FIG. 2B.

In one or more embodiments, the sleep logic 130 may include functionality to send a wake signal to the central sleep controller 110 and/or any other sleep block 120. Such functionality may be based on transition programs (provided by the central sleep controller 110), which may specify conditions for sending wake signals. For example, assume that the central sleep controller 110 programs the sleep logic 130 of the first sleep block 120A to send a wake signal to all other sleep blocks 120 in the event that a temperature measurement exceeds a maximum level. Thus, in the event that the temperature measurement exceeds the maximum level, the sleep logic 130 of the first sleep block 120A may send a wake signal to the second sleep block 120N. In response, the second sleep block 120N may wake from a sleep mode.

Figure 2B:
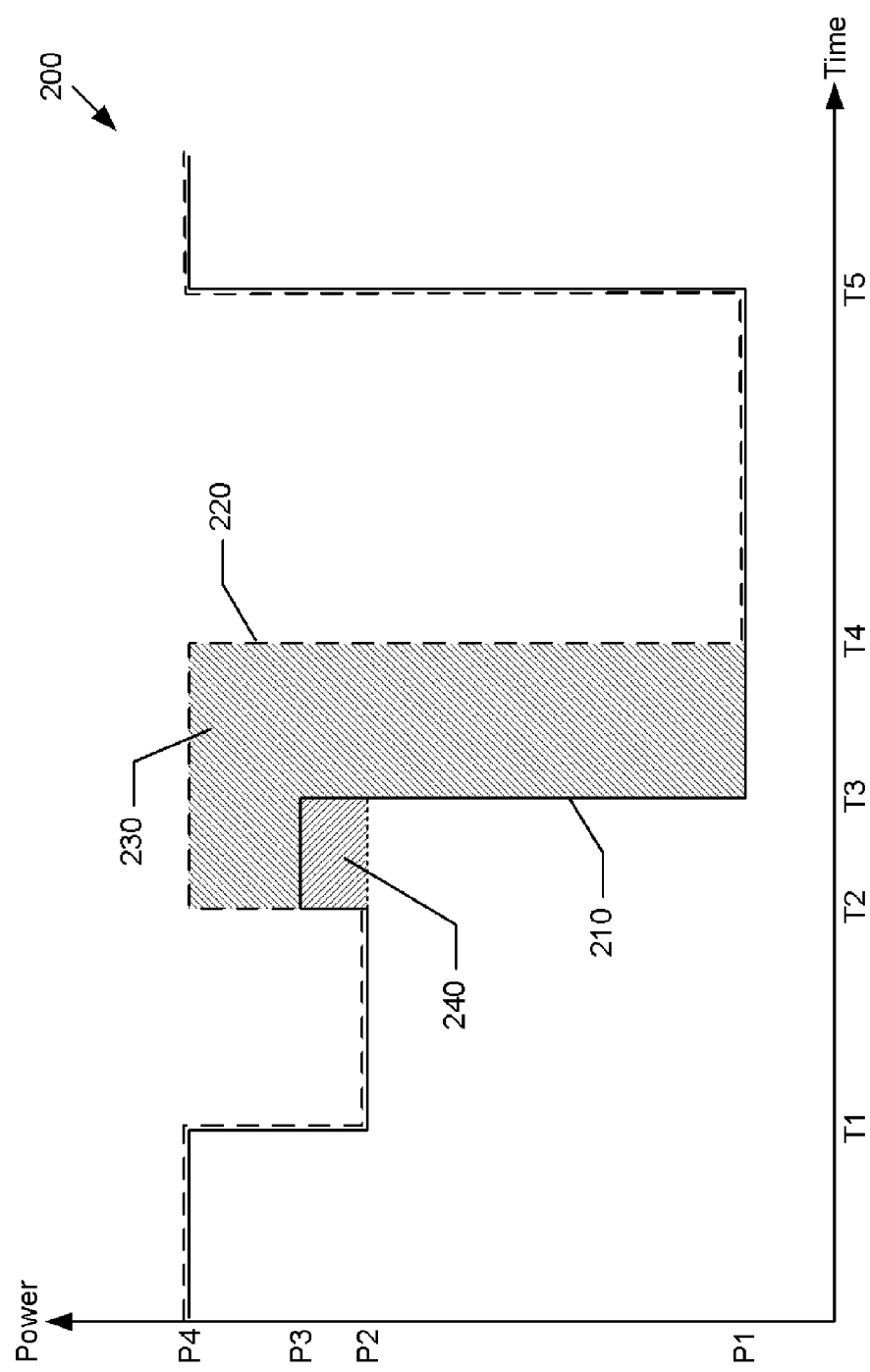

Referring now to FIG. 2B, shown is an example diagram 200 in accordance with one or more embodiments. In particular, the diagram 200 illustrates a plot of electrical power usage over time for a device (e.g., system 100 shown in FIG. 1A).

As shown, the diagram 200 includes a solid line 210 and a dotted line 220. Assume that the solid line 210 corresponds to the power consumption by the system 100 when using the sleep logic 130 (shown in FIG. 1A). Assume further that the dotted line 220 corresponds to the power consumption by a prior art system (e.g., a system not including the sleep logic 130).

As shown, the lines 210, 220 both begin at a fourth power level P4, indicating that the system 100 is initially operating in an awake mode (e.g., a full-power mode). At time T1, both lines 210, 220 drop to a second power level P2, indicating that the system 100 is operating in a first sleep mode. Assume that, at time T2, a sleep block 120 included in the system 100 is to begin a sleep transition to another sleep mode. Specifically, the sleep block 120 is to transition from a shallow sleep mode (corresponding to the second power level P2) to a deep sleep mode (corresponding to a first power level P1).

Conventionally, in order to transition from a first sleep mode to a second sleep mode, a device must initially switch as a whole from the first sleep mode to an awake mode, and then switch as a whole from the awake mode to the second sleep mode. Accordingly, the dotted line 220 (indicating power consumption when not using the sleep logic 130) rises to the fourth power level P4 at time T2, indicating that the entire system 100 is returned to the awake mode. The dotted line 220 then drops to the first power level P1, indicating that the system 100 enters the deep sleep mode at time T4. At time T5, the dotted line 220 returns to the fourth power level P4, indicating that the system 100 is operating in an awake mode.

As described above, the solid line 210 indicates power consumption by the system 100 when using the sleep logic 130. As shown, the solid line 210 rises from the second power level P2 to a third power level P3 at time T2, indicating that only a particular sleep block 120 enters a higher power state (e.g., an intermediate sleep mode or a fully awake mode) in order to complete the sleep transition. The solid line 210 then drops to the first power level P1, indicating that the particular sleep block 120 enters the deep sleep mode at time T3. As shown, the increase in power consumption above the second power level P2 (i.e., between time T2 and time T3) is indicated by a first shaded area 240, representing the energy cost associated with the sleep transition when using the sleep logic 130.

Note that the solid line 210 performs the sleep transition at a lower power level (i.e., the third power level P3) than that required by the dotted line 220 (i.e., the fourth power level P4). Further, note that the solid line 210 completes the sleep transition at an earlier time (i.e., time T3) than that required by the dotted line 220 (i.e., time T4). In some embodiments, these differences in required power levels and time may result because the sleep logic 130 enables a sleep transition to be performed for a particular sleep block 120 only, rather than for the entire system 100. As shown in FIG. 2B, these differences are illustrated by a second shaded area 230. In some embodiments, the second shaded area 230 may represent a reduction in power consumption when using the sleep logic 130 to perform the sleep transition.

Figure 1B:
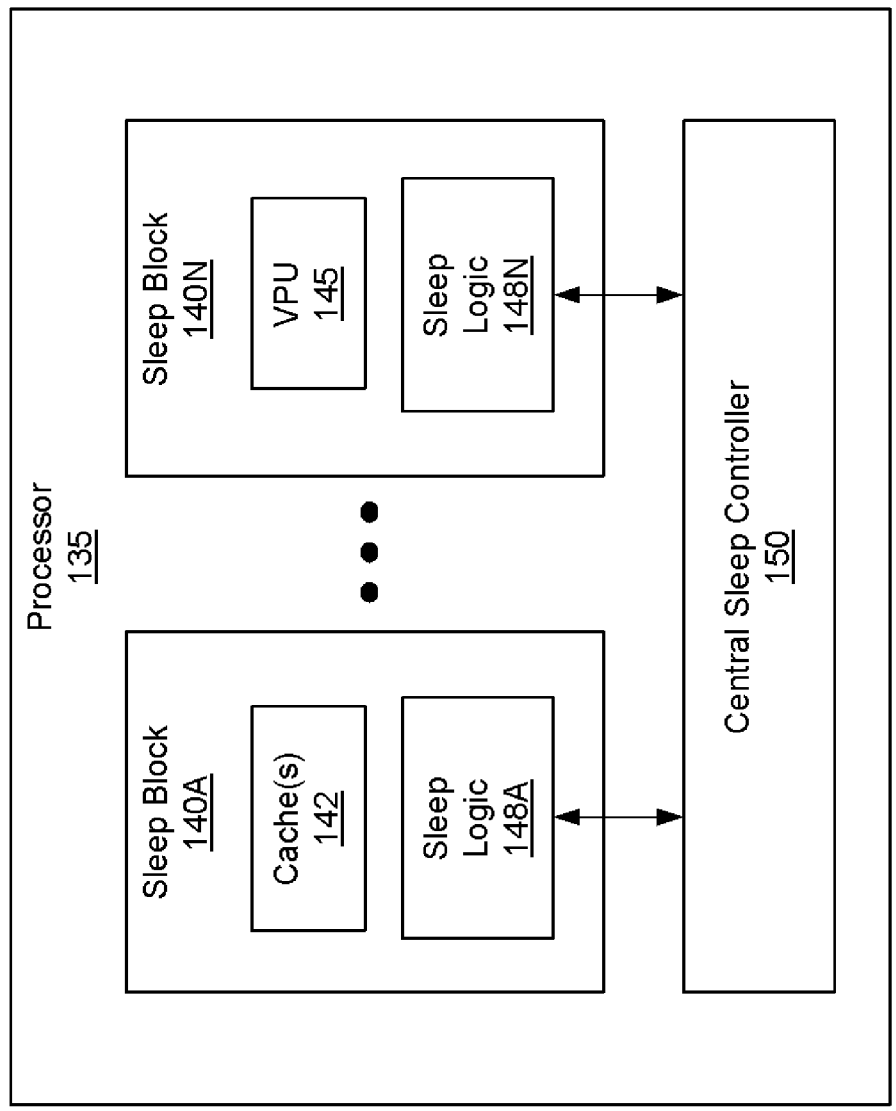

Referring now to FIG. 1B, shown is a block diagram of a processor 135 in accordance with one or more embodiments. More specifically, the processor 135 may generally correspond to an example embodiment of the system 100 shown in FIG. 1A.

As shown, the processor 135 may include any number of sleep blocks 140A-140N and a central sleep controller 150. Note that each sleep block 140 may generally correspond to an example embodiment of a sleep block 120 shown in FIG. 1A. Further, the central sleep controller 150 may generally correspond to an example embodiment of the central sleep controller 110 shown in FIG. 1A.

In one or more embodiments, each sleep block 140 may represent one or more components of the processor 135. For example, as shown in FIG. 1B, a first sleep block 140A may include one or more caches 142, and a second sleep block 140N may include a vector processing unit (VPU) 145. Further, in some embodiments, the sleep blocks 140A-140N may respectively include sleep logic 148A-148N. Each of the sleep logic 148A-148N may generally correspond to an example embodiment of the sleep logic 130 shown in FIG. 1A. Note that, while not shown for the sake of clarity, the sleep blocks 140A-140N may include any other component (s), such as processor cores, a translation lookaside buffer (TLB), a floating point unit (FPU), etc.

In some embodiments, the first sleep logic 148A may perform sleep transitions for the caches 142. For example, in the case that the caches 142 include an instruction cache, the first sleep logic 148A may perform a sleep transition by shutting off electrical power to the instruction cache. In another example, in the case that the caches 142 include a level two (L2) cache, the first sleep logic 148A may perform a sleep transition by driving write-backs from the L2 cache.

In some embodiments, the second sleep logic 148N may perform sleep transitions for the VPU 145. For example, the second sleep logic 148N may perform a sleep transition by restoring the caches 142 to an awake mode, and driving write-backs from the VPU 145 through the caches 142. Further, in some embodiments, the first sleep logic 148A and the second sleep logic 148N may be programmed to perform such sleep transitions by the central sleep controller 150.

Figure 3:
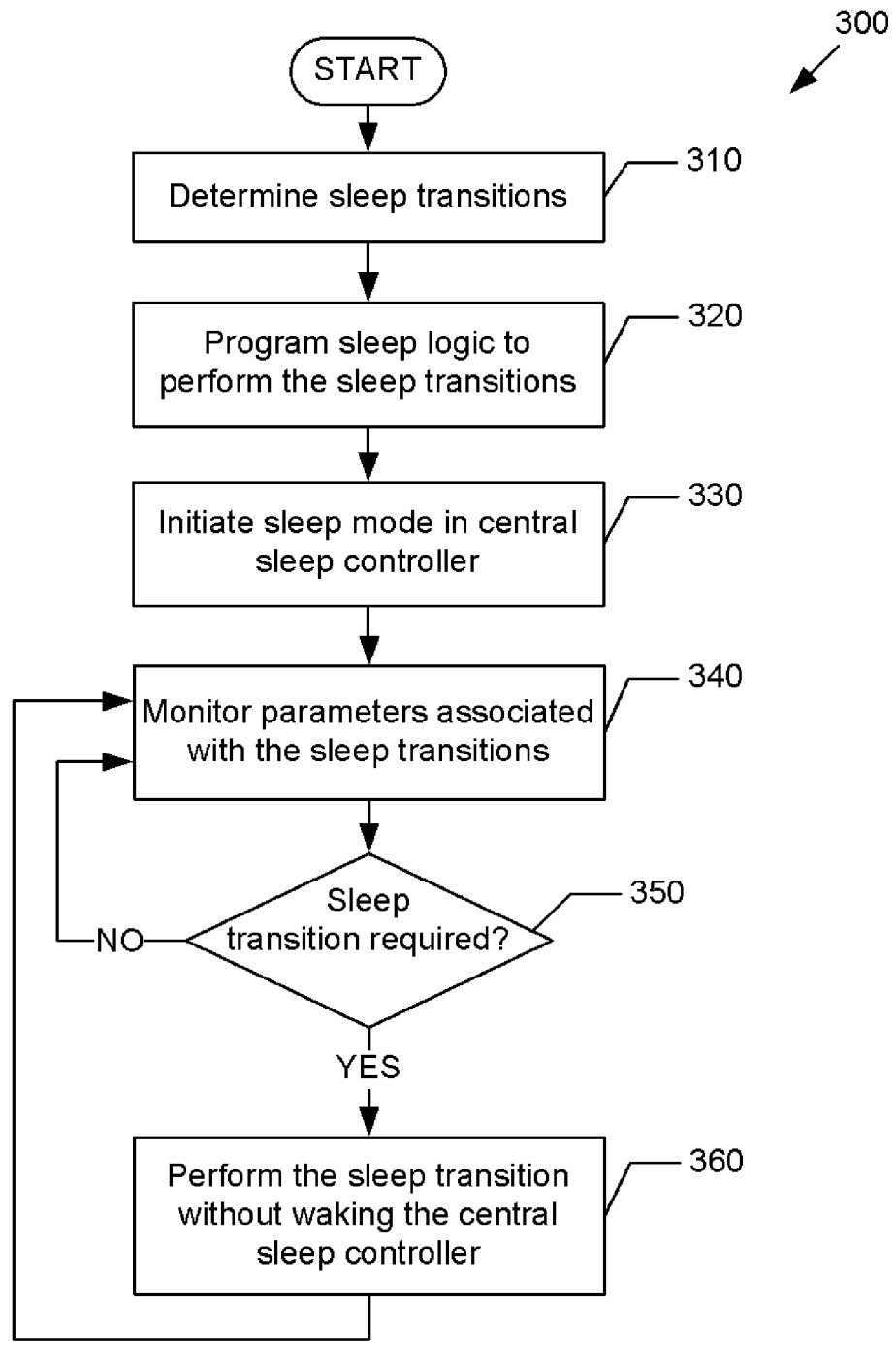
FIG. 3 is a sequence in accordance with one or more embodiments.

Referring now to FIG. 3, shown is a sequence 300 for managing sleep modes, in accordance with one or more embodiments. In one or more embodiments, the sequence 300 may be part of the central sleep controller 110 and/or the sleep logic 130 shown in FIG. 1A. The sequence 300 may be implemented in hardware, software, and/or firmware. In firmware and software embodiments it may be implemented by computer executed instructions stored in a non-transitory computer readable medium, such as an optical, semiconductor, or magnetic storage device.

At step 310, one or more sleep transitions may be determined. For example, referring to FIG. 1A, the central sleep controller 110 may determine sleep transitions for the sleep blocks 120A-120N. In some embodiments, such sleep transitions may include actions to be performed to transition a sleep block 120 into or out of a sleep mode (e.g., sleep modes 256A-256N shown in FIG. 2A).

At step 320, sleep logic may be programmed to perform the sleep transitions (determined at step 310). For example, referring to FIG. 1A, the central sleep controller 110 may program the sleep logic 130 (included in each of the sleep blocks 120A-120N) to perform the determined sleep transitions. In one or more embodiments, such programming may involve any type of program information (e.g., code, firmware, registers, flags, settings, etc.) and/or parameters (e.g., events, values, levels, loads, costs, commands, signals, etc.). For example, such programming may include sending a transition program (e.g., code instructions) from the central sleep controller 110 to the sleep logic 130, and storing the transition program in the sleep logic 130. In another example, the central sleep controller 110 may configure one or more components of the sleep logic 130 (e.g., control registers, logic gates, etc.).

At step 330, a sleep mode may be initiated in a central sleep controller. For example, referring to FIG. 1A, the central sleep controller 110 may place itself into a sleep mode in order to reduce power consumption. In some embodiments, step 330 may be performed as part of initiating a system-wide sleep mode. For example, the central sleep controller 110 may initiate a sleep mode for the system 100 as a whole, including the central sleep controller 110 and the sleep blocks 120A-120N. Note that, although steps 320 and 330 are shown as sequential steps in FIG. 3, it is not intended to indicate that each performance of one step is necessarily tied to a corresponding performance of the other step. For instance, in one example situation, the programming of the sleep logic 130 (i.e., step 320) may be performed during a scheduled monthly maintenance period, while a system-wide sleep mode (i.e., step 330) may be performed several times in any given day.

At step 340, one or more parameters associated with the sleep transitions may be monitored. For example, referring to FIG. 1A, the sleep logic 130 in each of the sleep blocks 120A-120N may monitor parameters associated with sleep transitions. Such parameters may include, e.g., a system event, a voltage level, a timing value, a user command, a digital signal, etc.

At step 350, a determination about whether a sleep transition is required may be made based on the parameters (monitored at step 340). For example, referring to FIG. 1A, the sleep logic 130 in sleep block 120A may determine whether the monitored parameters satisfy any conditions indicating a need for a sleep transition. In some embodiments, such conditions may be specified in a transition program stored in the sleep logic 130.

If it is determined at step 350 that a sleep transition is not required, then the sequence 300 returns to step 340 to continue monitoring the parameters. However, if it is determined at step 350 that a sleep transition is required, the sequence 300 continues at step 360.

At step 360, the required sleep transition may be performed without waking the central sleep controller. For example, referring to FIG. 1A, the sleep logic 130 may perform a sleep transition for the sleep block 120A without waking the central sleep controller 110 (e.g., without causing the central sleep controller 110 to exit the sleep mode initiated at step 330). Further, the sleep logic 130 may perform this sleep transition without waking any other sleep blocks (e.g., sleep block 120N) may also be in a sleep mode. After step 360, the sequence 300 may return to step 340 to continue monitoring the parameters associated with sleep transitions.

Note that the examples shown in FIGS. 1A-1B, 2A-2B, and 3 are provided for the sake of illustration, and are not intended to limit any embodiments. For instance, while embodiments may be shown in simplified form for the sake of clarity, embodiments may include any number and/or arrangement of processors, cores, and/or additional components (e.g., buses, storage media, connectors, power components, buffers, interfaces, etc.). In particular, it is contemplated that some embodiments may include any number of blocks, components, or controllers other than those shown, and that different arrangement of the components shown may occur in certain implementations. Further, it is contemplated that specifics in the examples shown in FIGS. 1A-1B, 2A-2B, and 3 may be used anywhere in one or more embodiments.

Figure 4:
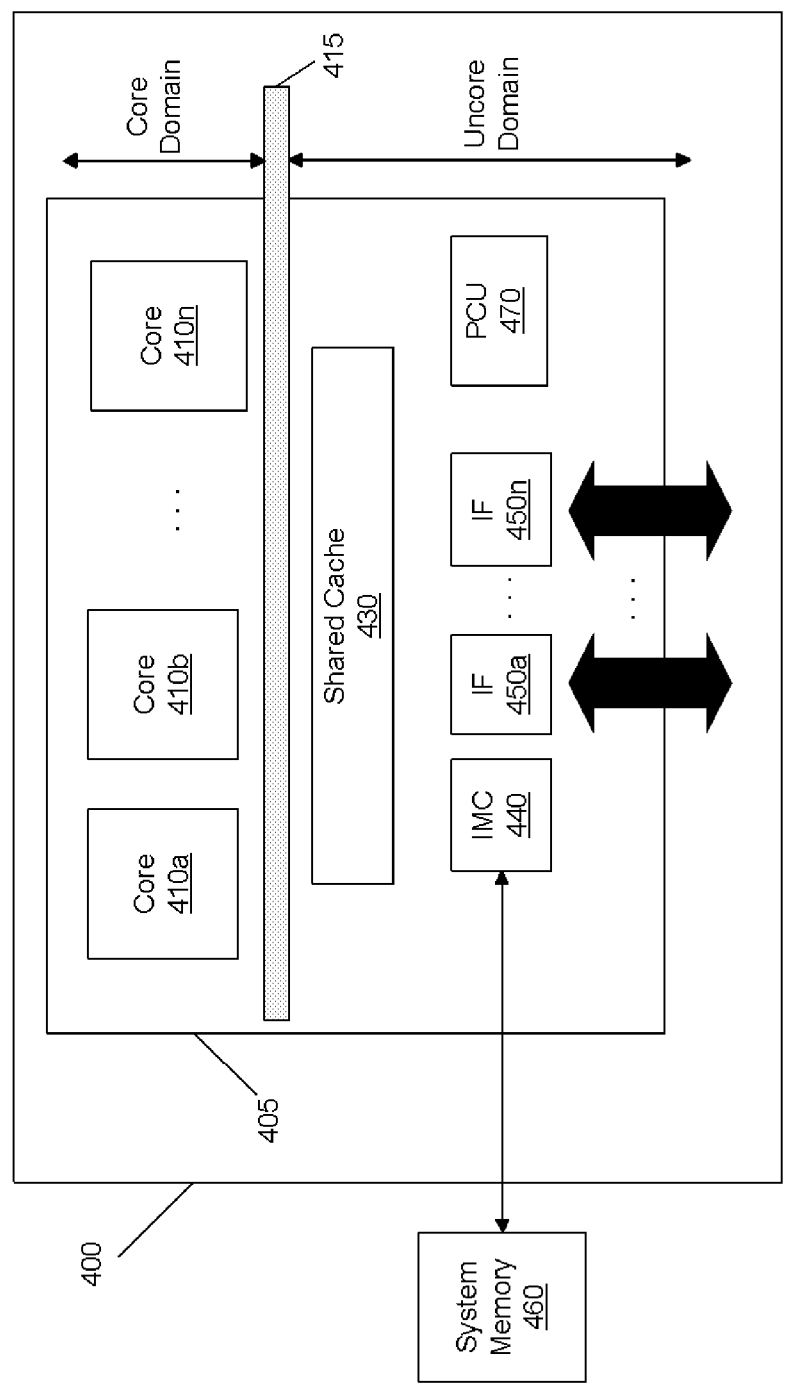
FIG. 4 is a block diagram of a processor in accordance with an embodiment of the present invention.

Referring now to FIG. 4, shown is a block diagram of a processor in accordance with an embodiment of the present invention. As shown in FIG. 4, the processor 400 may be a multicore processor including first die 405 having a plurality of cores 410a-410n of a core domain. The various cores 410a-410n may be coupled via an interconnect 415 to a system agent or uncore domain 420 that includes various components. As seen, the uncore domain 420 may include a shared cache 430 which may be a last level cache. In addition, the uncore may include an integrated memory controller 440, a power control unit (PCU) 470, and various interfaces 450.

Although not shown for ease of illustration in FIG. 4, in some embodiments, each of the cores 410a-410n may include the central sleep controller 110 and/or the sleep logic 130 shown in FIG. 1A. Alternatively, in some embodiments, the central sleep controller 110 may be included in the PCU 470, and each of the cores 410a-410n may include the sleep logic 130.

Note that the central sleep controller 110 and/or the sleep logic 130 described herein may be independent of and/or complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth). Note that as more cores of a processor socket enter into deeper low power states, the activity level of the processor reduces and accordingly, so too may the uncore frequency, according to certain power management features of the processor such as implemented via the PCU 470.

With further reference to FIG. 4, the processor 400 may communicate with a system memory 460, e.g., via a memory bus. In addition, by interfaces 450, connection can be made to various off-package components such as peripheral devices, mass storage and so forth. While shown with this particular implementation in the embodiment of FIG. 4, the scope of the present invention is not limited in this regard.

Figure 5:
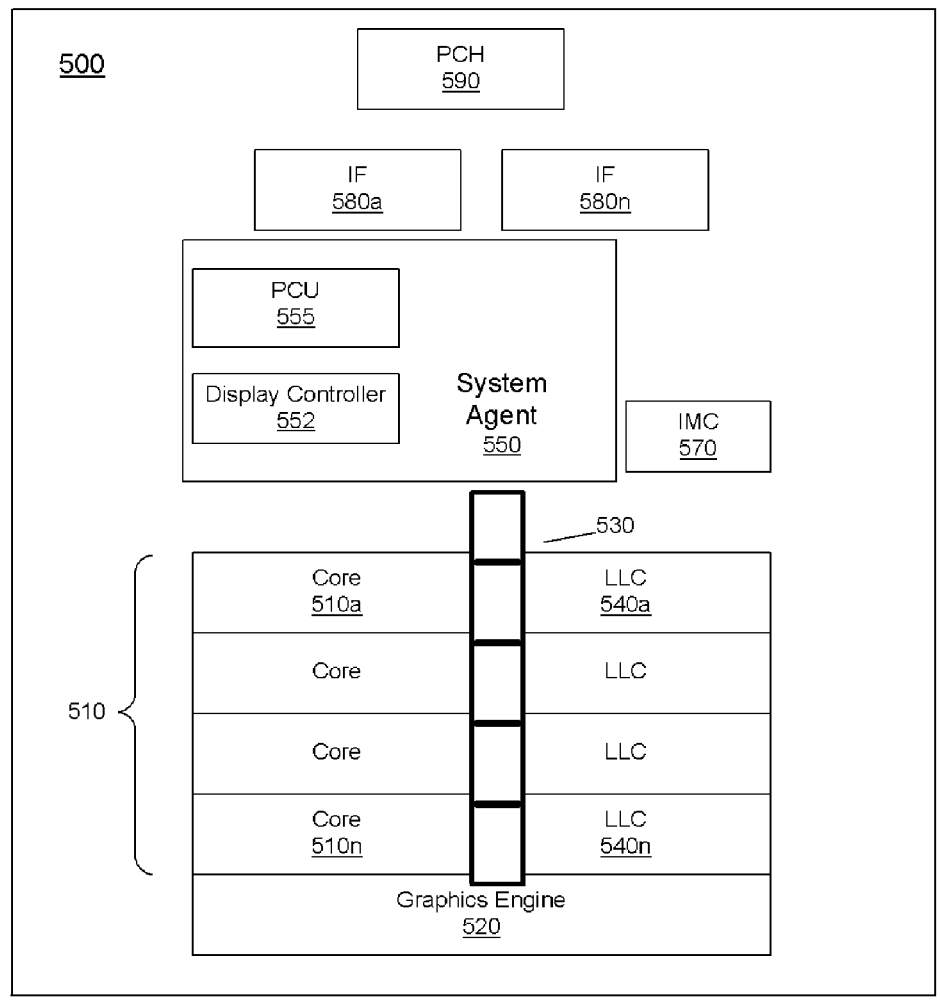
FIG. 5 is a block diagram of a multi-domain processor in accordance with another embodiment of the present invention.

Referring now to FIG. 5, shown is a block diagram of a multi-domain processor in accordance with another embodiment of the present invention. As shown in the embodiment of FIG. 5, processor 500 includes multiple domains. Specifically, a core domain 510 can include a plurality of cores 510a-510n, a graphics domain 520 can include one or more graphics engines, and a system agent domain 550 may further be present. Although not shown for ease of illustration in FIG. 5, in some embodiments, each of the cores 510a-510n can include the sleep logic 130 described above with reference to FIG. 1A. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) 540a-540n. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In the embodiment of FIG. 5, system agent domain 550 may include display controller 552 which may provide control of and an interface to an associated display. As further seen, system agent domain 550 may also include a power control unit 555 to allocate power to the CPU and non-CPU domains. In some embodiments, the power control unit 555 may include some or all of the functionality of the central sleep controller 110 and/or the sleep logic 130 described above with reference to FIG. 1A.

As further seen in FIG. 5, processor 500 can further include an integrated memory controller (IMC) 570 that can provide for an interface to a system memory, such as a dynamic random access memory (DRAM). Multiple interfaces 580a-580n may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. As further seen, a peripheral controller hub (PCH) 590 may also be present within the processor, and can be implemented on a separate die, in some embodiments. Although shown at this high level in the embodiment of FIG. 5, understand the scope of the present invention is not limited in this regard.

Figure 6:
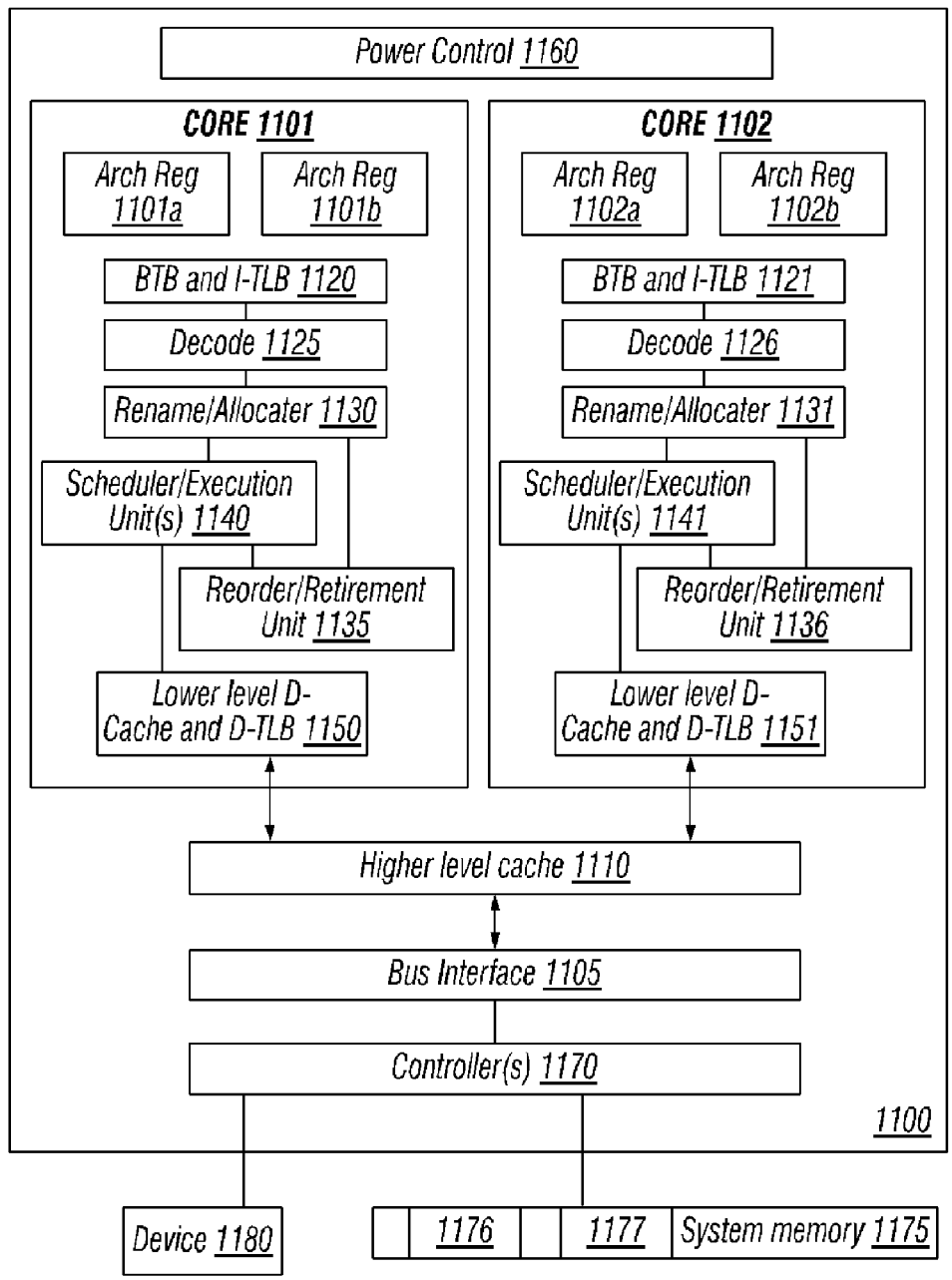
FIG. 6 is a block diagram of an embodiment of a processor including multiple cores.

Referring to FIG. 6, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric. Although not shown for ease of illustration in FIG. 6, in some embodiments, each of the cores 1101 and 1102 can include the central sleep controller 110 and/or the sleep logic 130 described above with reference to FIG. 1A.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 6, includes two cores, cores 1101 and 1102. Here, cores 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As shown, core 1101 includes two hardware threads 1101*a* and 1101*b*, which may also be referred to as hardware thread slots 1101*a* and 1101*b*. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101*a*, a second thread is associated with architecture state registers 1101*b*, a third thread may be associated with architecture state registers 1102*a*, and a fourth thread may be associated with architecture state registers 1102*b*. Here, each of the architecture state registers (1101*a*, 1101*b*, 1102*a*, and 1102*b*) may be referred to as processing elements, thread slots, or thread units, as described above.

As illustrated, architecture state registers 1101*a* are replicated in architecture state registers 1101*b*, so individual architecture states/contexts are capable of being stored for logical processor 1101*a* and logical processor 1101*b*. In core 1101, other smaller resources, such as instruction pointers and renaming logic in allocator and renamer block 1130 may also be replicated for threads 1101*a* and 1101*b*. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 6, an embodiment of a purely exemplary processor with illustrative logical units/ resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101*a*, 1101*b*, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. As a result of the recognition by decoders 1125, the architecture or core 1101 takes specific, predefined actions to perform tasks associated with the appropriate instruction (e.g., one or more of the actions shown in FIG. 3). It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101*a* and 1101*b* are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. In some embodiments, the power controller 1160 may include some or all of the functionality of the central sleep controller 110 and/or the sleep logic 130 described above with reference to FIG. 1A.

Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 7:
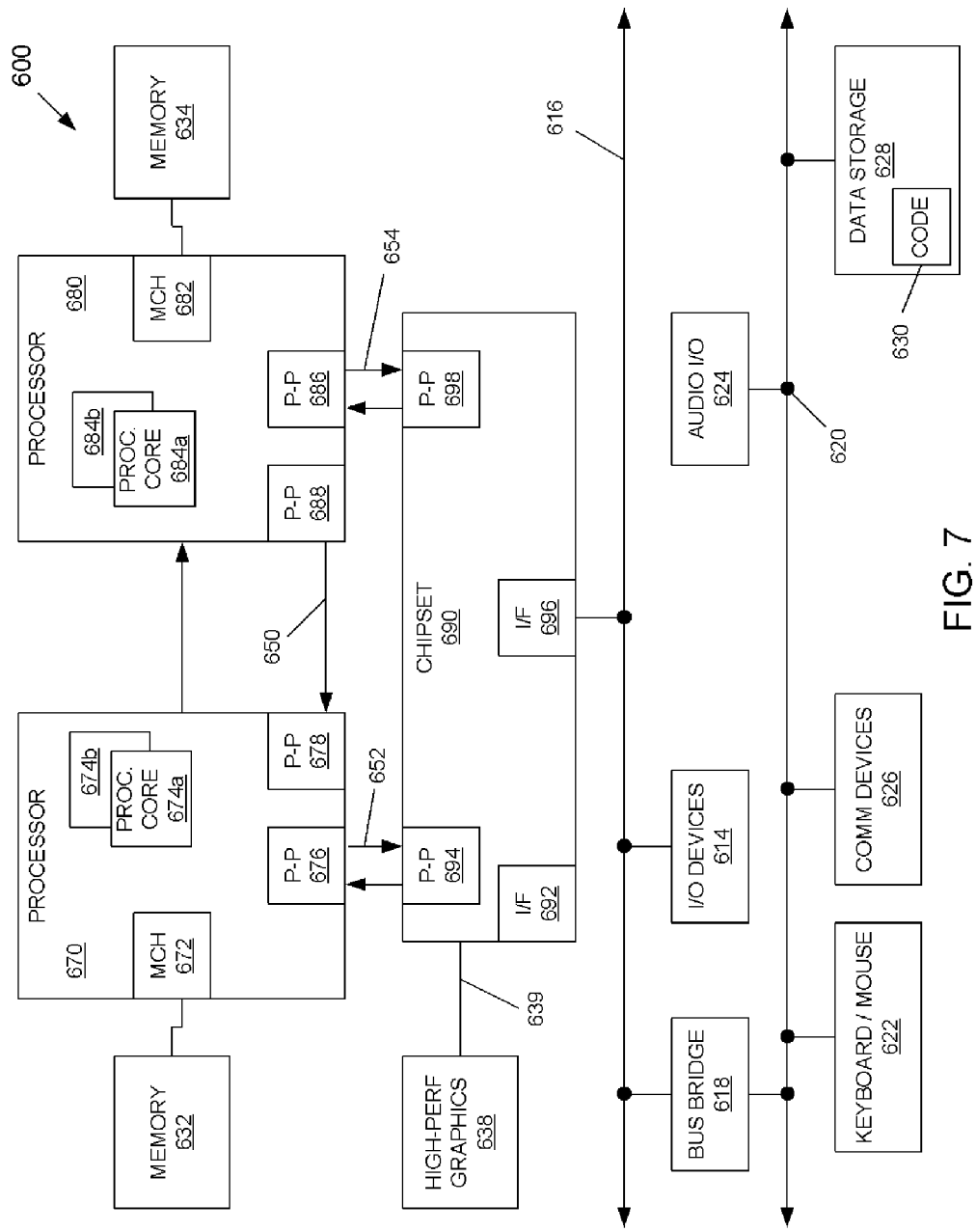
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674a and 674b and processor cores 684a and 684b), although potentially many more cores may be present in the processors. Each of these processors can include any part of the central sleep controller 110 and/or the sleep logic 130 described above with reference to FIG. 1A.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

It should be understood that a processor core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

Any processor described herein may be a general-purpose processor, such as a Core™ i3, i5, i7, 2 Duo and Quad, Xeon™, Itanium™, XScale™ or StrongARM™ processor, which are available from Intel Corporation, of Santa Clara, Calif. Alternatively, the processor may be from another company, such as ARM Holdings, Ltd, MIPS, etc. The processor may be a special-purpose processor, such as, for example, a network or communication processor, compression engine, graphics processor, co-processor, embedded processor, or the like. The processor may be implemented on one or more chips. The processor may be a part of and/or may be implemented on one or more substrates using any of a number of process technologies, such as, for example, BiCMOS, CMOS, or NMOS.

It is contemplated that the processors described herein are not limited to any system or device. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following clauses and/or examples pertain to further embodiments. One example embodiment may be a processor including at least one sleep block and a central sleep controller. The at least one sleep block may include at least one execution unit, at least one processor component, and sleep logic. The central sleep controller may be to program the sleep logic to perform at least one sleep transition for the at least one sleep block, and to operate in a first sleep mode. The sleep logic may be to perform the at least one sleep transition for the at least one sleep block without waking the central sleep controller from the first sleep mode. The at least one sleep transition may include a transition from a shallow sleep mode to a deep sleep mode. The at least one sleep transition may also include a transition from a deep sleep mode to a shallow sleep mode. The sleep logic may be to determine, based on one or more parameters, whether the at least one sleep transition is to be performed. The central sleep controller may be to program the sleep logic using one or more transition programs. The sleep logic may be to store the one or more transition programs. The central sleep controller may be to initiate the first sleep mode for the processor as a whole. The at least one processor component may be an instruction cache, and the at least one sleep transition may include shutting off power to the instruction cache. The at least one processor component may be a level two (L2) cache, and the at least one sleep transition may include driving write-backs from the L2 cache. The at least one processor component may be a vector processing unit, and the at least one sleep transition may include restoring at least one cache to an awake mode, and driving write-backs from the vector processing unit through the at least one cache. The at least one processor component may be a translation lookaside buffer (TLB).

Another example embodiment may be a system including one or more sleep blocks, each including at least one hardware block component, and sleep logic to control one or more sleep modes. The system may also include a central sleep controller to: program the sleep logic to perform a plurality of sleep transitions, and initiate a system-wide sleep mode, where the sleep logic is to perform one of the plurality of sleep transitions without waking the central sleep controller from the system-wide sleep mode. The central sleep controller may be to program the sleep logic in preparation for initiating the system-wide sleep mode. The central sleep controller may be to program the sleep logic in response to an event. The sleep logic may be to perform the one of the plurality of sleep transitions in response to a specified period of inactivity. The sleep logic may be to perform the one of the plurality of sleep transitions to satisfy a required time of response for the system.

Yet another example embodiment may be a method, including: programming, by a central sleep controller, a sleep logic to perform a sleep transition for a sleep block of a processor, where the sleep block comprises the sleep logic and at least one hardware component; initiating, by the central sleep controller, a first sleep mode for the sleep block and the central sleep controller; and performing, by the sleep logic, the sleep transition for the sleep block without waking the central sleep controller from the first sleep mode. Programming the sleep logic may include: sending a transition program from the central sleep controller to the sleep logic; and storing the transition program in the sleep logic. Programming the sleep logic may include configuring at least one control register of the sleep logic. The method may further include determining, by the central sleep controller, a plurality of sleep transitions for a plurality of sleep blocks. The method may further include: monitoring, by the sleep logic, at least one parameter associated with the sleep transition; and determining, based on the at least one parameter, whether the sleep transition is to be performed. Performing the sleep transition may include transitioning from a shallow sleep mode to a deep sleep mode. Performing the sleep transition may include transitioning from a deep sleep mode to a shallow sleep mode.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments for the sake of illustration, those skilled in the art will appreciate numerous modifications and variations therefrom. It is intended that the appended claims cover all such modifications and variations as fall within the true spirit and scope of this present invention.

What is claimed is:

1. A processor comprising a sleep block and a central sleep controller to control a plurality of sleep modes of the processor,
   wherein the sleep block includes:
      at least one execution unit;
      at least one processor component;
      sleep logic to control a plurality of sleep modes of the sleep block; and
   wherein the central sleep controller in the processor is to:
      determine a first sleep transition to be performed by the sleep logic for the sleep block, the first sleep transition including a set of actions required to transition a sleep mode of the sleep block;
      program the sleep logic with a transition program to perform the first sleep transition of the sleep mode of the sleep block, and
      initiate a first sleep mode for the processor as a whole,
      wherein the sleep logic is to execute the transition program to perform the first sleep transition for the sleep block without waking the central sleep controller from the first sleep mode.

2. The processor of claim 1, wherein the first sleep transition comprises a transition from a shallow sleep mode to a deep sleep mode.

3. The processor of claim 1, wherein the first sleep transition comprises a transition from a deep sleep mode to a shallow sleep mode.

4. The processor of claim 1, wherein the sleep logic is further to determine, by executing the transition program, whether the first sleep transition is to be performed.

5. The processor of claim 1, wherein the sleep logic is to execute the transition program using one or more parameters determined by the sleep logic.

6. The processor of claim 1, wherein the sleep logic is to store the transition program.

7. The processor of claim 1, wherein the central sleep controller is to program the sleep logic with the transition program for the sleep block in response to a requirement to initiate the first sleep mode for the processor as a whole.

8. The processor of claim 1, wherein the at least one processor component is an instruction cache, and wherein the first sleep transition comprises shutting off power to the instruction cache.

9. The processor of claim 1, wherein the at least one processor component is a level two (L2) cache, and wherein the first sleep transition comprises driving write-backs from the L2 cache.

10. The processor of claim 1, wherein the at least one processor component is a vector processing unit, and wherein the first sleep transition comprises restoring at least one cache to an awake mode, and driving write-backs from the vector processing unit through the at least one cache.

11. The processor of claim 1, wherein the at least one processor component is a translation lookaside buffer (TLB).

12. A system comprising:
a processor including a plurality of sleep blocks and a central power controller; and
a platform memory coupled to the processor,
wherein each sleep block of the processor includes:
  at least one hardware block component;
  sleep logic to control one or more sleep modes of the sleep block; and
wherein the central sleep controller of the processor is to:
  determine a first sleep transition to be performed by the sleep logic of a first sleep block of the plurality of sleep blocks, the first sleep transition including a set of actions required to transition a sleep mode of the first sleep block;
  program the sleep logic of the first sleep block with a transition program to perform the first sleep transition, and
  initiate a system-wide sleep mode for the processor,
  wherein the sleep logic of the first sleep block is to execute the transition program to perform the first sleep transition for the first sleep block without waking the central sleep controller of the processor from the system-wide sleep mode.

13. The system of claim 12, wherein the central sleep controller is to program the sleep logic of the first sleep block with the transition program in preparation for initiating the system-wide sleep mode for the processor.

14. The system of claim 12, wherein the central sleep controller is to program the sleep logic of the first sleep block with the transition program in response to a requirement to initiate the system-wide sleep mode for the processor.

15. The system of claim 12, wherein the sleep logic is to perform the first sleep transition in response to a specified period of inactivity.

16. The system of claim 12, wherein the sleep logic is to perform the first sleep transition to satisfy a required time of response for the system.

17. A method, comprising:
  programming, by a central sleep controller included in a processor, a sleep logic with a transition program to perform a sleep transition for a sleep block included in the processor, wherein the sleep block included in the processor comprises the sleep logic and at least one hardware component;
  initiating, by the central sleep controller of the processor, a first sleep mode for the sleep block included in the processor and the central sleep controller of the processor; and
  executing, by the sleep logic of the sleep block, the transition program to perform the sleep transition for the sleep block without waking the central sleep controller of the processor from the first sleep mode.

18. The method of claim 17, wherein programming the sleep logic of the sleep block comprises:
  sending the transition program from the central sleep controller of the processor to the sleep logic of the sleep block; and
  storing the transition program in the sleep logic of the sleep block.

19. The method of claim 17, wherein the transition program includes a set of actions executed by the sleep logic of the sleep block to perform the sleep transition for the sleep block included in the processor.

20. The method of claim 17, further comprising:
  determining, by the central sleep controller of the processor, a plurality of sleep transitions for a plurality of sleep blocks included in the processor.

21. The method of claim 17, further comprising:
  monitoring, by the sleep logic, at least one parameter associated with the sleep transition; and
  determining, based on the at least one parameter, whether the sleep transition is to be performed.

22. The method of claim 17, wherein performing the sleep transition comprises transitioning from a shallow sleep mode to a deep sleep mode.

23. The method of claim 17, wherein performing the sleep transition comprises transitioning from a deep sleep mode to a shallow sleep mode.

* * * * *